Sept. 13, 1955 C. A. OBMA 2,717,774
NOZZLE CLEANING BACKFLOW APPARATUS
Filed March 23, 1951
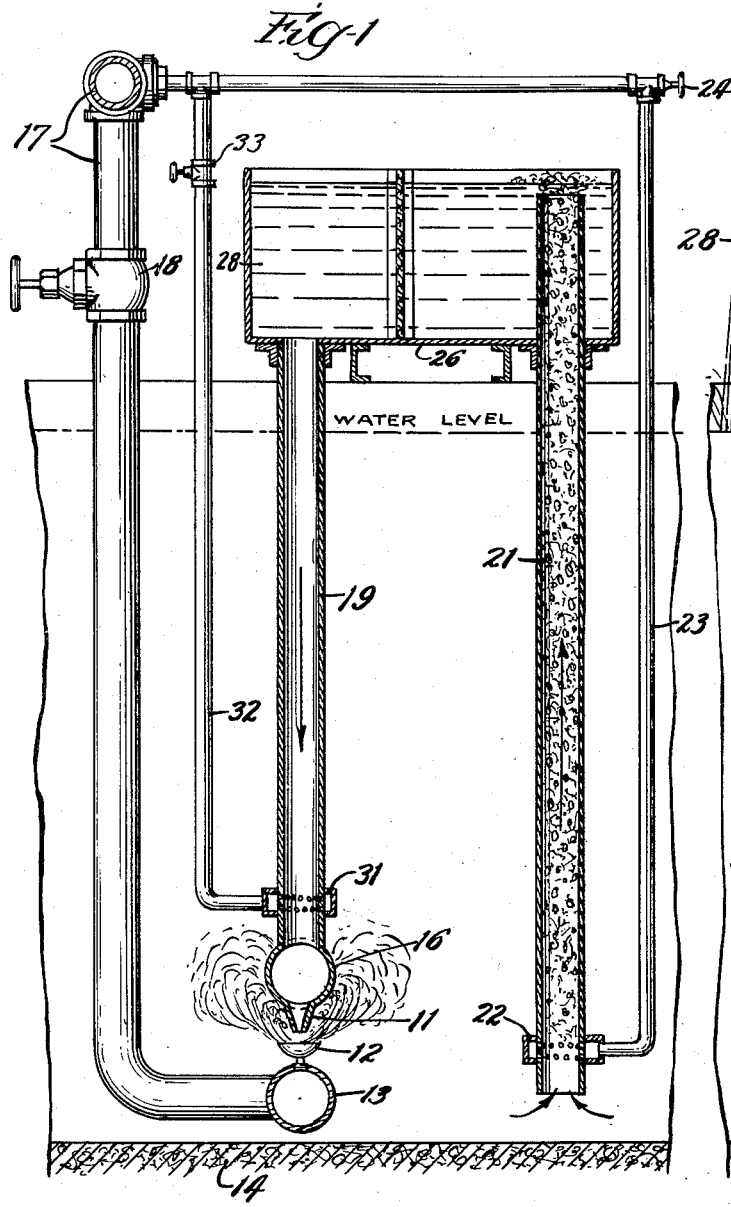
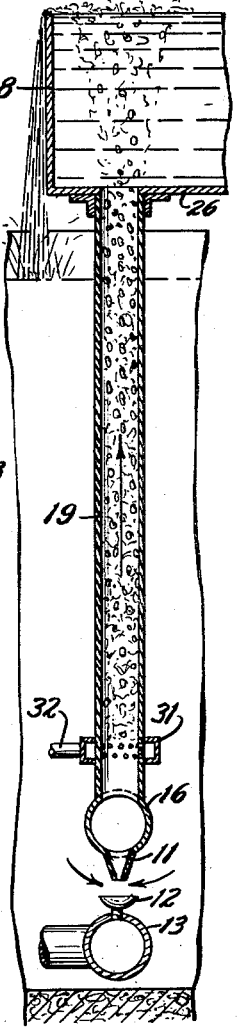
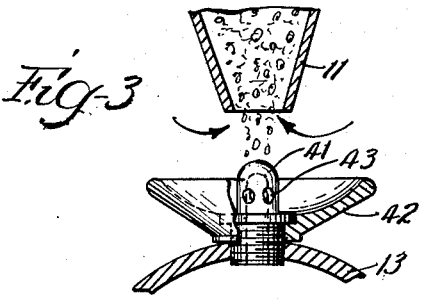
INVENTOR.
Chester A. Obma
BY
Louis Robertson
Atty.

2,717,774
Patented Sept. 13, 1955

2,717,774

NOZZLE CLEANING BACKFLOW APPARATUS

Chester A. Obma, Aurora, Ill., assignor to Walker Process Equipment Inc., Aurora, Ill., a corporation of Illinois Application March 23, 1951, Serial No. 217,231

2 Claims. (Cl. 261—121)

In the aeration of sewage the most trouble-free system yet devised (see Walker Patent No. 2,573,941) has involved sets of nozzles through which liquid drawn from the aeration tank is flowed back into the tank. It is possible to make these nozzles of fairly large cross-section and to screen the liquid which is to be discharged through them so that clogging is very rare. Nevertheless, there is occasional clogging, perhaps most often due to the building-up of a grease ball in the vicinity of the nozzle. According to the present invention, even this occasional difficulty is overcome. The present application is in part a continuation of application Serial No. 106,020, filed July 21, 1949, and abandoned after the filing of this application.

According to the present invention a substantial backflow or suction force is applied to the nozzles so that water is drawn into them from the tank and drawn through them and the supply lines to clear out the obstructions therein. Preferably the nozzles are of internally converging shape downwardly so that an obstruction is easily dislodged by the backflow. The suction is applied very inexpensively by providing a vertical pipe which normally delivers liquid to the nozzles with an air lift inlet ring near its bottom so that compressed air can be admitted to the pipe to produce an air lift effect.

Additional objects and advantages of the invention will become apparent from the following description and from the drawings.

Designation of figures

Figure 1 is a view partly in section showing the form of the invention chosen for illustration.

Fig. 2 is a fragmentary view corresponding with a portion of Fig. 1 and showing the back flushing operation.

Figure 3 is an enlarged view of a slightly modified form of the air liberating unit.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

In the form of the invention chosen for illustration, each aerating unit includes a water nozzle 11 and a combined air nozzle and impingement cup 12. Air may be liberated below the cup 12 from header 13 (through the stem which supports the cup) and flow upwardly below the cup to the swirling thin stream of water passing from cup 12 in all directions. As a result, very fine bubbles are mixed throughout the water in the vicinity, producing an air lift effect which causes a swirling of the entire mass of water in the tank 14 with admixture of the air throughout the tank. Of course for a large tank such as is conventionally used for treatment of sewage, water or waste, a large number of the illustrated aeration units would be provided. Thus there may be a series of cups 12 along the length of one header 13 and a series of nozzles 11 along the length of one water delivery header 16.

Air under sufficient compression to produce its liberation at the bottom of the tank is supplied to header 13 by air supply pipes 17 which may be controlled as by a valve 18.

Water for the nozzles 11 is supplied to header 16 by a vertically extending pipe 19. The water passed through the pipe 19 is usually drawn directly from the tank itself by a suitable pump. The pump may be of a mechanical type such as a centrifugal pump, but an air lift pump such as that illustrated is preferred. The air lift pump comprises a tube or pipe 21 into which air is discharged near its open bottom through perforations communicating with a ring 22. Compressed air is supplied to the ring 22 by a pipe 23 communicating with pipe 17 and controlled by valve 24. According to the well-known air lift principle, the bubbles of air passing up through the pipe 21 so lighten the contents of the pipe that the water pressure of the water in the surrounding pipe causes water to flow upwardly through the air lift pipe 21 and can raise it a substantial distance above the surrounding water level.

The upper or outlet end of the air lift pipe 21 communicates with a head tank 26. This head tank opens upwardly to the atmosphere so that air entrapped in the water flowing into the tank 26 through pipe 21 may escape from this water and leave in the tank water substantially free from air bubbles. This water flows through a screen to a discharge chamber 28 with which the pipe 19 communicates.

The screen removes any solids which at the time are large enough to possibly clog the nozzles 11. Nevertheless the nozzles 11 do occasionally become clogged. According to the present invention they are freed from their obstructions by a backflow operation.

With mechanical pumps the backflow could be accomplished by reversing the pump connections. With the air lift pump or with any type of pump in which a head tank is used, an air lift backflow may be more desirable. Thus in the illustrated form of the invention a ring 31 similar to the ring 22 surrounds pipe 19 near its bottom and communicates with it through perforations. When backflow is desired, air is supplied to ring 31 by pipe 32 upon opening valve 33. The pipe 19 is thus converted to an air lift pump functioning quite similarly to the air lift pump 21. As a matter of fact, it may exert an even greater pumping force than is commonly utilized in air lift pipe 21 because more air may be supplied.

Thus in operating air lift pipe 21 an effort will naturally be made to supply only enough air to deliver the desired quantity of water. In the case of pipe 21, however, the backflow will be of such short duration that economy of air will not be significant. Accordingly, it is possible to apply by pipe 19 a fairly strong suction to header 16 and nozzles 11. Such suction, in reality the pressure of the surrounding water, is almost invariably capable of freeing from the nozzles 11 any obstruction therein. It will be noted that the nozzle is preferably of an internal shape which converges toward its outlet so that the obstruction will be readily freed by the backflow movement.

For the sake of illustration, Fig. 2 avoids the indication of the passage of air from the member 12. As a matter of preferred practice, the air flow from member 12 would probably not be shut off. Fig. 2 would nevertheless approximately indicate the initiation of the backflow. As soon as the backflow started, the air bubbles emitted from the member 12 would be drawn with the water into the nozzle 11. These air bubbles would not only supply air for continuation of the airlift action but would also result in a scouring action on the inside of nozzle 11. Of course this scouring action is dependent upon the presence of the liquid. In fact, it is the liquid made turbulent by the air bubbles which accomplishes the scouring action.

With the modified form of air-liberating device shown in Fig. 3, the air ring 31 and the perforations within it could be omitted. With this form of invention, the air nozzle 41 is located inside of impingement cup 42, the air apertures 43 being so located that air passing out from them will tend to pass, in part at least, into the nozzle 11. Backflushing may then be accomplished merely by closing valve 24 and perhaps waiting until the water from head tank 26 has flowed nearly down to the level of the water in the main tank 14. As the flow of water down through nozzle 11 decreases the time will come when the air will pass upwardly into the nozzle 11 and reverse the flow by the airlift principle. It is nevertheless preferred to provide air ring 31 and the perforations therewith for more reliable starting of the airlift action and for probably producing a greater airlift force. This is particularly desirable in instances where the nozzle 11 is badly clogged.

Although the nozzle 11 itself is not a part of the invention, suitable dimensions therefor may be helpful. The following dimensions have been found to be satisfactory, although of course wide variations may be possible: Internal diameter 1½ inches tapering to ⅝ inch or ¾ inch; length 3 inches. The nozzle may be of cast metal bolted by an external flange to the pipe 16, preferably being sealed thereto by a gasket for purposes of economy.

Operation

When there is a clogging condition at one or more of the nozzles 11, the backflow operation will be produced merely by closing valve 24 and opening valve 33. As a matter of fact, opening valve 33 would suffice. This causes considerable air to flow from ring 31 into the lower portion of pipe 19. An air lift is thus produced which frees the clogged nozzles 11 and pumps copious quantities of water upwardly into head tank 26. As indicated in Fig. 2, the quantity of water will usually be so large that it will overflow the sides of tank 26 and fall into the main tank 14. If, as preferred, valve 24 is closed, pipe 21 will no longer serve as an air lift pump and water will flow downwardly through it under the influence of the head of water in tank 26. The walls of tank 26 are high enough to partially confine the flow of water entering tank 26 from tank 19 so that some of the water flows through the screen 27 and down the pipe 21. This produces a backwash action on the screen 27, freeing from it nearly all of the particles which may have gathered on it and may tend to clog it. The flow of water up through pipe 19 is heavy enough so that ordinarily all solids will be washed out of tank 26, mostly flowing over the sides of delivery chamber 28. The solids backwashed from screen 27 may either be washed over the sides of tank 26 or carried down through pipe 21 to the main body of water within the tank 14. Air from adjacent cup 12 is drawn into nozzle 11, causing the water with it to exert a scouring action.

Other gases may be used instead of air. In fact, a colleague has pointed out that $CO_2$ liberated adjacent nozzle 12 would have an advantage of forming carbonic acid which would have an acid cleaning action on nozzle 11. The terms "air" and "aeration" may be taken as referring broadly to gases.

From the foregoing it is seen that a very reliable aeration system has been developed in which when clogging does occur it can very easily be remedied by a simple backflow operation.

I claim:

1. The combination of a tank adapted to hold a liquid up to a given level, means for discharging gas into the liquid in the tank including outlet means deep in the tank, a nozzle adjacent and above said outlet means positioned to alternately direct liquid toward said outlet means for contact with said gas and receive gas from said outlet means, liquid supply means including a supply pipe connected to the nozzle for supplying liquid thereto, extending upwardly from the nozzle and being open closely above the liquid level of the tank, means for supplying liquid to said pipe above the liquid level of the tank, means for shutting off said liquid supply while maintaining gas flow through said outlet means whereby said gas is caused to enter said nozzle and by gaslift action in said supply pipe draw liquid with gas bubbles therein through the nozzle to scour the nozzle and remove any obstructions therefrom.

2. The combination of a tank adapted to hold a liquid up to a given level, means for discharging gas into the liquid in the tank including outlet means deep in the tank, a nozzle adjacent and above said outlet means positioned to alternately direct liquid toward said outlet means for contact with said gas and receive gas from said outlet means, liquid supply means including a supply pipe connected to the nozzle for supplying liquid thereto, extending upwardly from the nozzle and being open closely above the liquid level of the tank, means for supplying liquid to said pipe above the liquid level of the tank, means for shutting off said liquid supply and for supplying gas to said supply pipe just above said nozzle while maintaining gas flow through said outlet means whereby gaslift action in said supply pipe will draw liquid with gas bubbles therein through the nozzle to scour the nozzle and remove any obstructions therefrom.

References Cited in the file of this patent

UNITED STATES PATENTS

| Number | Name | Date |
|---|---|---|
| 464,622 | Gales | Dec. 8, 1891 |
| 830,552 | Zeigler | Sept. 11, 1906 |
| 973,263 | Darapsky | Oct. 18, 1910 |
| 1,021,009 | Speer | Mar. 26, 1912 |
| 1,286,775 | Rein et al. | Dec. 3, 1918 |
| 1,574,783 | Beth | Mar. 2, 1926 |
| 1,867,512 | Kusch | July 12, 1932 |
| 2,077,907 | Streander | Apr. 20, 1937 |
| 2,616,676 | Walker | Nov. 4, 1952 |

FOREIGN PATENTS

| Number | Country | Date |
|---|---|---|
| 19,915 | Great Britain | Oct. 12, 1914 |
| 146,397 | Great Britain | June 9, 1921 |
| 244,734 | Great Britain | Nov. 23, 1925 |
| 412,555 | Germany | Apr. 24, 1925 |
| 772,684 | France | Nov. 3, 1934 |